United States Patent [19]
Smoot et al.

[11] 3,771,463
[45] Nov. 13, 1973

[54] CONTROL SYSTEMS FOR VEHICLES OPERATING ON A TRACK

[75] Inventors: Charles H. Smoot, Wayzata; Lowell A. Kleven, Bloomington, both of Minn.

[73] Assignee: Uniflo Systems Company, Edina, Minn.

[22] Filed: Nov. 30, 1971

[21] Appl. No.: 203,256

[52] U.S. Cl. .................. 104/155, 104/149, 246/108
[51] Int. Cl. .............................................. B60v 3/04
[58] Field of Search .................... 104/149, 152, 153, 104/155, 134; 246/108, 110

[56] References Cited
UNITED STATES PATENTS

| | | | |
|---|---|---|---|
| 1,880,149 | 9/1932 | Neale | 246/110 X |
| 3,242,876 | 3/1966 | Berggren | 104/134 |
| 3,263,625 | 8/1966 | Midis et al. | 104/149 |

*Primary Examiner*—Drayton E. Hoffman
*Assistant Examiner*—George H. Libman
*Attorney*—Ralph T. Dugger et al.

[57] ABSTRACT

A vehicle transportation system operating along a guideway including a control system for regulating the speed and spacing between vehicles operated in the same guideway and utilizing guideway mounted sensors for detecting the presence of a vehicle, in combination with timers regulating the speed of the detected vehicle in relation to a nominal selected speed, and also regulating the spacing of the trailing vehicles in relation to the lead vehicle by regulating the speed of the trailing vehicle. The sensors can be used for controlling the merging of a starting vehicle into a main line at the proper position and also for insuring proper separation at intersecting tracks.

20 Claims, 13 Drawing Figures

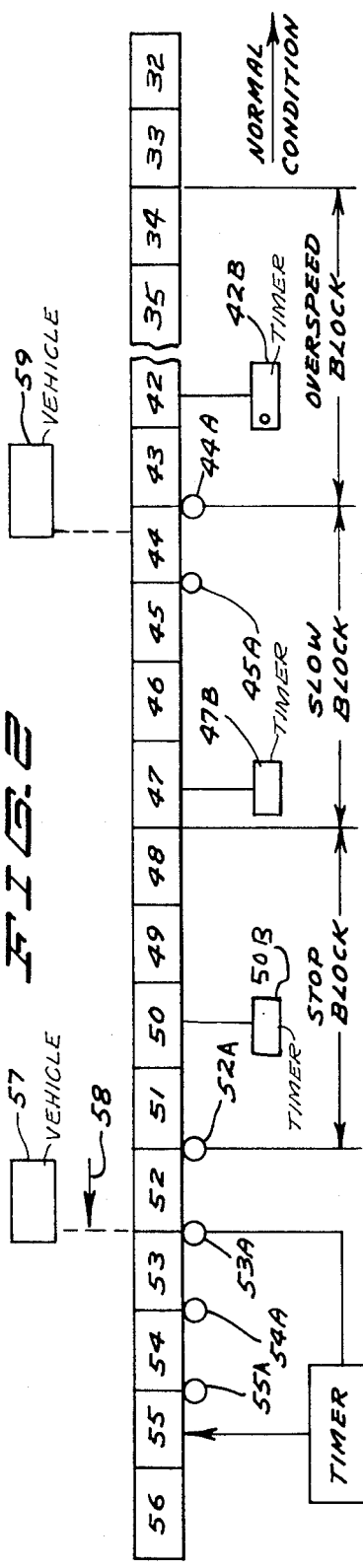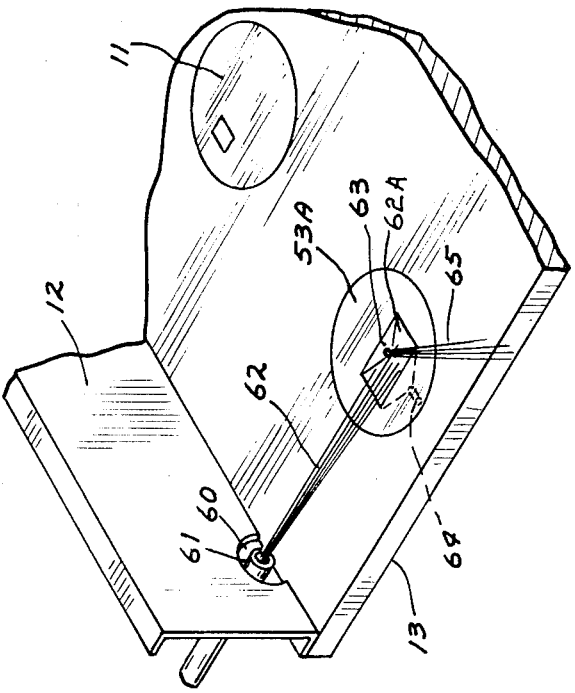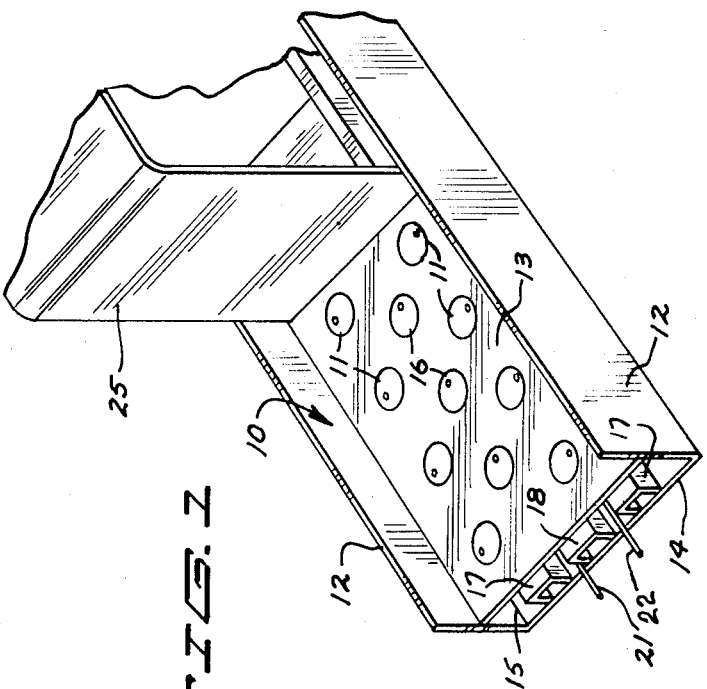

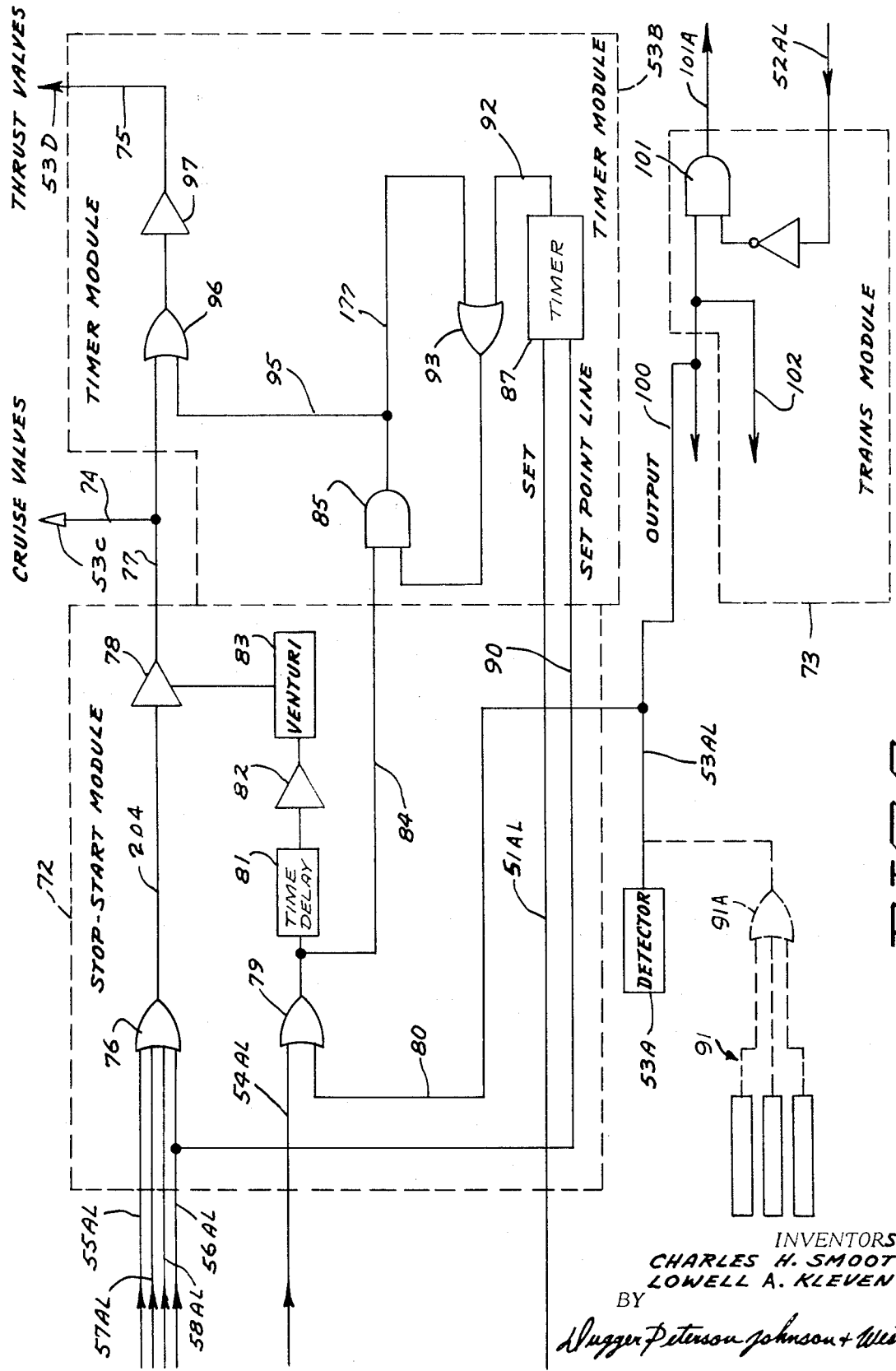

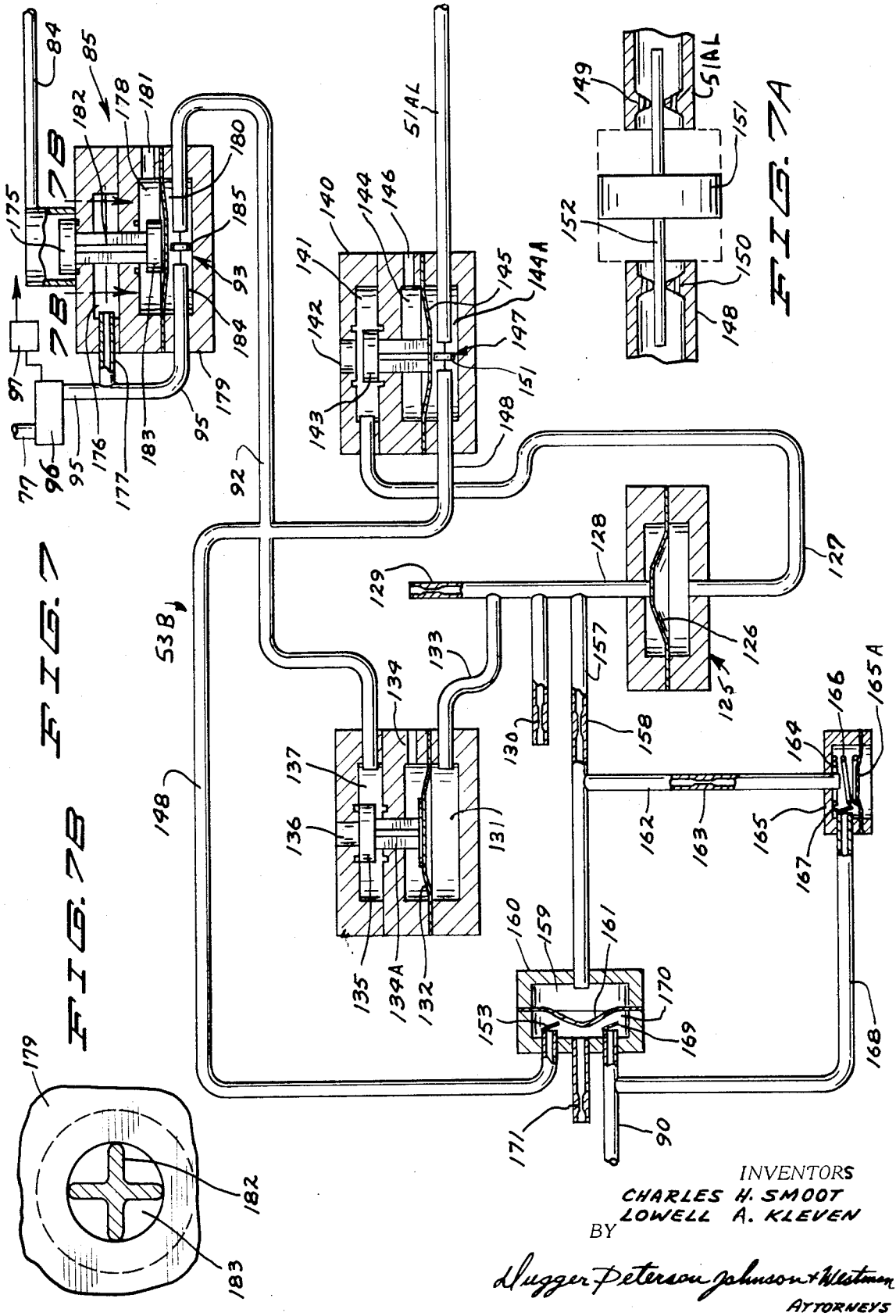

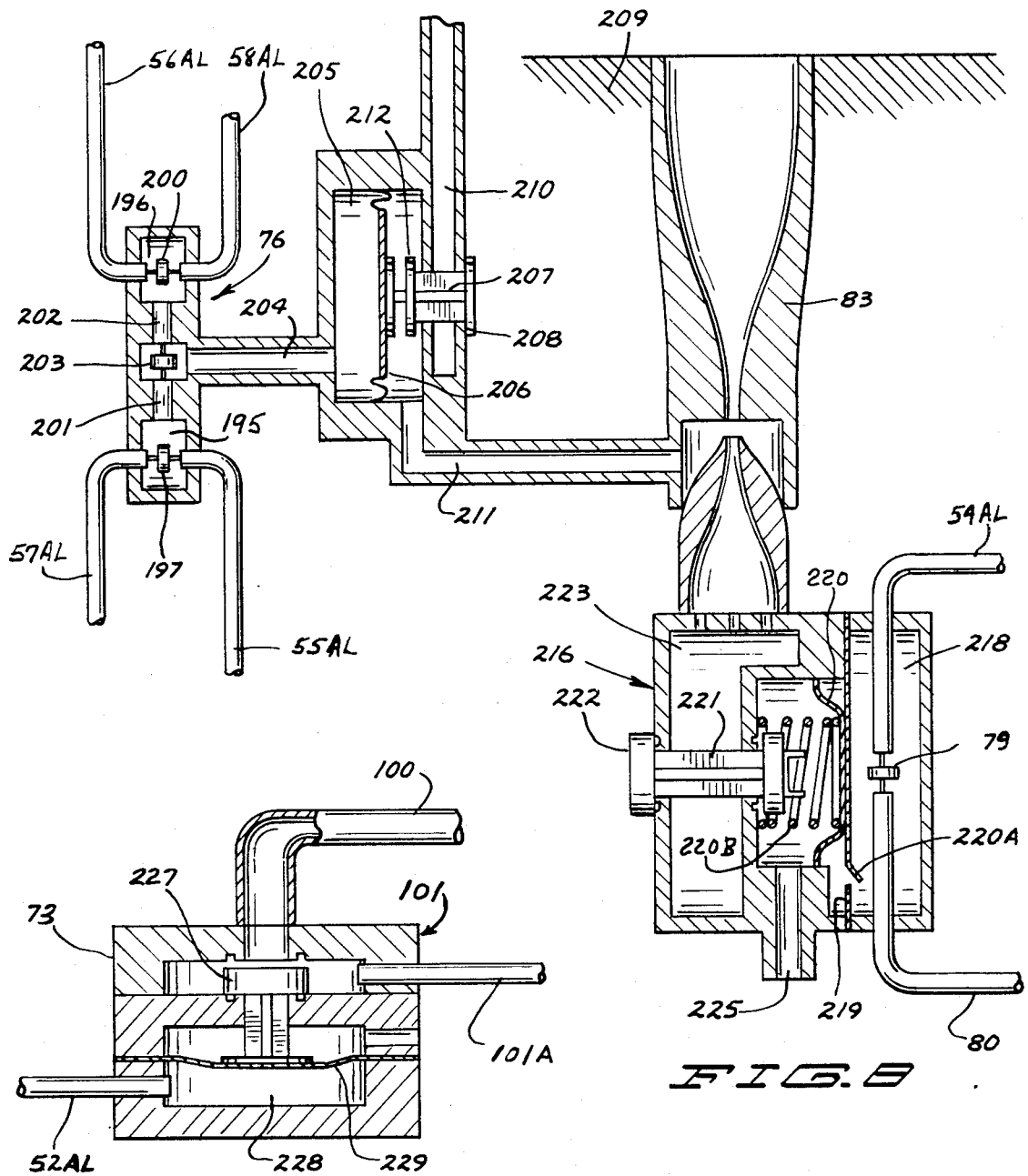

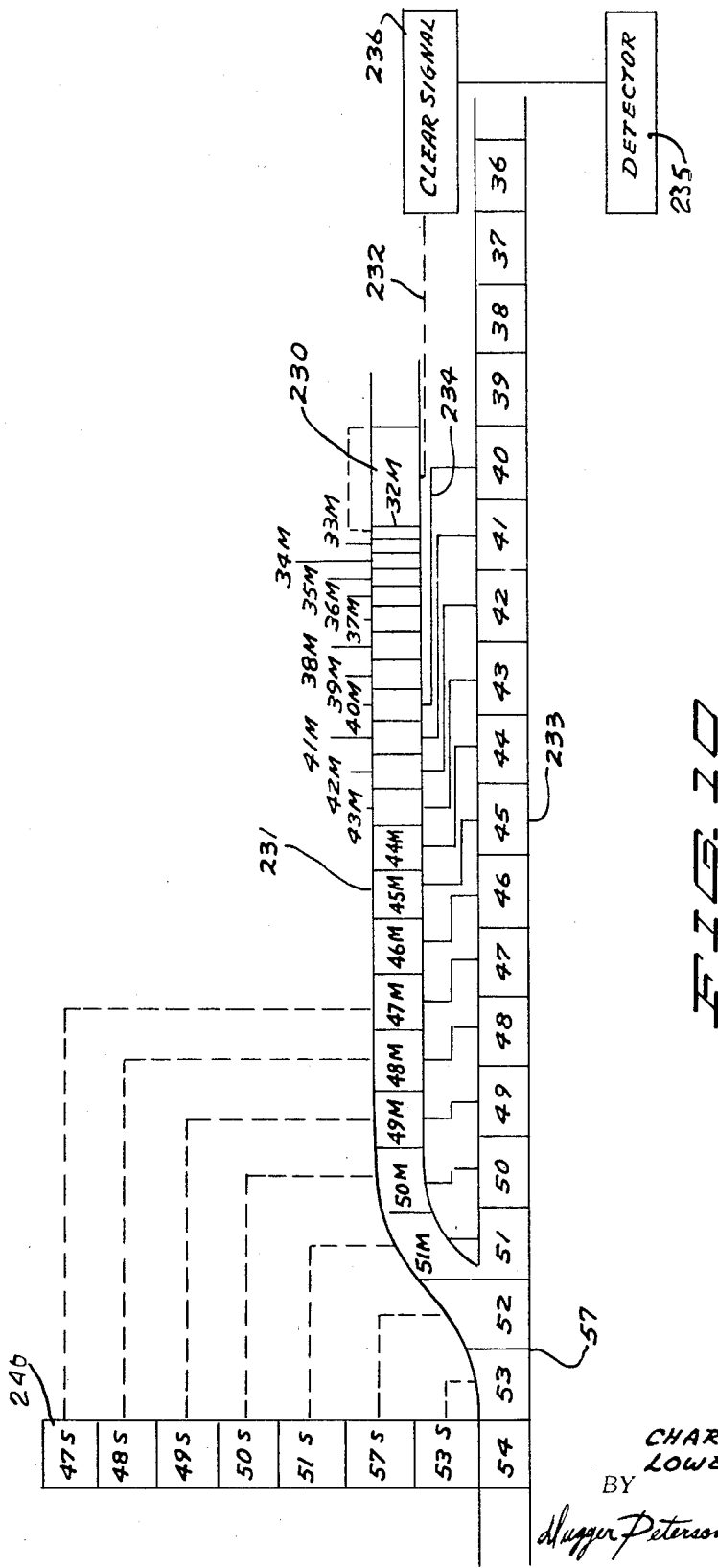

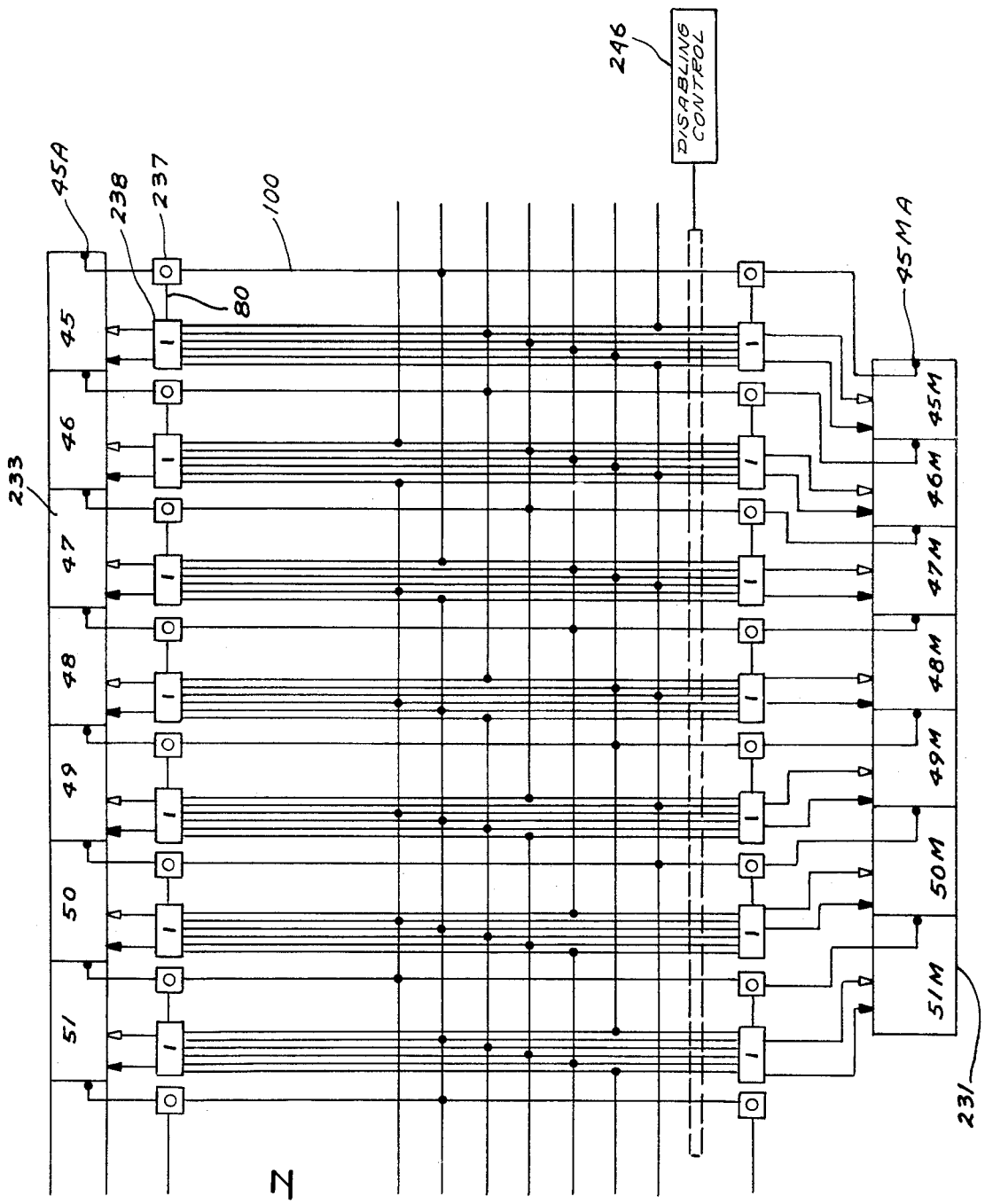

CONTROL SYSTEMS FOR VEHICLES OPERATING ON A TRACK

BACKGROUND OF THE INVENTION

1. Field of the Invention

The present invention relates to regulating the speed and spacing between vehicles operating on a track or guideway.

2. Prior Art

In the control of tracked vehicles most developments have concentrated on vehicles or trains that have on board power supplies, and utilize some signals, either visual or mechanical to regulate the power supply on the vehicle or train itself to maintain a proper interval between the vehicles or trains, and also in some instances to regulate the speed of the vehicle. With visual signals an operator will adjust the power for the vehicle to adjust the vehicle speed.

In personalized rapid transit systems which operate along guideways, it is desirable to regulate the spacing of vehicles or trains automatically because of the use of many unattended vehicles which lower operating costs for these systems. The U.S. Pat. to Berggren, Pat. No. 3,242,876 shows a type of levitated vehicle system wherein an elemental spacing control for individual vehicles is described. The system uses automatically opening levitating and propulsion valves in a guideway and the valves are prevented from opening for a preselected time after they have once been actuated. This provides a type of spacing control by preventing vehicles from receiving levitating air if they are too close to the leading vehicle, but these valves do not regulate or control the actual speed of the vehicles.

Computer controls for tracked vehicles are utilized, and an example of such control is shown in U.S. Pat. No. 3,403,634 relating to a railway passenger vehicle system.

U.S. Pat. No. 3,408,113 discloses a system that permits the use of several separated segments in a transportation guideway, and wherein each of the segments is used to transport only one vehicle, thus keeping a proper spacing between vehicles.

U.S. Pat. No. 3,540,378 shows a passive element levitated vehicle utilizing a subplenum chamber which hinders the recharging of the plenums to maintain a spacing between vehicles operating in the same guideway.

SUMMARY OF THE INVENTION

The present invention relates to a system for maintaining the speed of vehicles or trains of vehicles operating on a guideway, and also for maintaining proper spacing between vehicles when there is more than one vehicle operating on the same guideway.

The control system is operated through the use of track mounted detectors and controls which react to each vehicle on the track in the same manner, and are used to regulate the speed of each vehicle relative to the track. In addition, the track mounted detectors are used for maintaining proper spacing between vehicles. The block concept is utilized. There is a "stop block", a slow block and an overspeed block behind each vehicle that is being controlled. The presence of the vehicle triggers detectors and control mechanism to present the "stop block" zone immediately rearwardly of each vehicle into which no other trailing vehicle can enter because all drive power is removed and full emergency brakes applied. The slow speed block is behind the stop block. A vehicle may enter and follow along in the slow speed block, but it will be propelled at a slower speed than the nominal desired speed for a vehicle. The overspeed block follows the slow speed block and will cause following vehicles in this block to speed up, and to move closer to the leading vehicle to maintain a predetermined spacing between vehicles. The effect of the lead vehicle on the spacing control is removed from the controls following the overspeed block and the vehicles are propelled at the nominal desired speed.

All of the control units are track or guideway mounted so that each vehicle is sensed and controlled in the same manner by a particular control member. Therefore if there is an aberration or malfunction in the control devices, each of the vehicles will be handled in a like manner and thus the entire system is not necessarily shut down. Because the individual control sections are short, if the controls for one of the sections fail a vehicle will generally be able to traverse or coast through this section and keep operating on the rest of the track.

The speed control is achieved by sensing the time elasped from the actuation of a vehicle detector in one of the sections until the vehicle that tripped the detector reaches a detector for a track section farther along the guideway or track. If the vehicle reaches the second detector more quickly than desired, less thrust or propulsive force is added to the vehicle, but if the vehicle does not reach the second detector within a preselected time, additional thrust or power is supplied to the vehicle to increase its speed. The spacing control is provided by utilizing a signal from the detectors tripped by the lead vehicle to adjust preselected time period of the timers between the vehicle detectors used for speed control and in this way control the speed of a trailing vehicle in relation to the position of the front vehicle.

The safety stop block is provided to stop any vehicles which come too close to a lead vehicle and this block zone extends for a set distance behind the lead vehicle and follows the lead vehicle.

The motive power for the vehicles as disclosed is supplied through thrust valves which give pneumatic thrust to levitated vehicles and the levitation air is supplied through separate valves. The valves are normally automatically actuated by the levitation pressure under a levitated vehicle.

The controls as shown are all pneumatic. The vehicle detectors deliver a signal to inhibit the proper valves from operation and also to start proper pneumatic timers. The pneumatic timers are adjustable in time period to provide proper time intervals for the slow and fast blocks. In the stop block following a vehicle all the valves are inhibited (both thrust and levitation valves). Means are also provided for pneumatically restarting a vehicle that has to be relevitated.

The principles of the control can be used with other types of controls, such as electric, and also can be used with other propulsion means and other guideways.

BRIEF DESCRIPTION OF THE DRAWINGS

FIG. 1 is a fragmentary perspective view of a typical portion of a guideway utilizing the present invention showing a vehicle moving therealong;

FIG. 2 is a schematic plan view of a guideway divided into guideway sections according to the present invention and showing schematically the controls used therefore;

FIG. 3 is a fragmentary perspective view of a portion of a vehicle guideway showing a vehicle detector mounted thereon;

FIG. 5 is a schematic representation of one set of controls for the present invention;

FIG. 7 is a schematic representation of a typical pneumatically operated timer that has a variable time period and which is used with the present invention;

FIG. 7A is a fragmentary enlarged view of a shuttle valve type "OR gate" used with the pneumatic system of the present invention;

FIG. 7B is a sectional view taken as on line 7B—7B in FIG. 7;

FIG. 8 is a sectional schematic representation of a start-stop module used for pneumatically starting vehicles with the present invention;

FIG. 9 is a sectional view of a control utilized for adapting the system to use with trains of vehicles comprising several vehicles hooked together;

FIG. 10 is a schematic representation of an acceleration lane for merging vehicles into a main guideway and also a schematic representation of intersecting guideways; and FIG. 11 is a schematic representation of pneumatic connections necessary to control the main guideways and merging guideway.

DESCRIPTION OF THE PREFERRED EMBODIMENT

Figure 4:
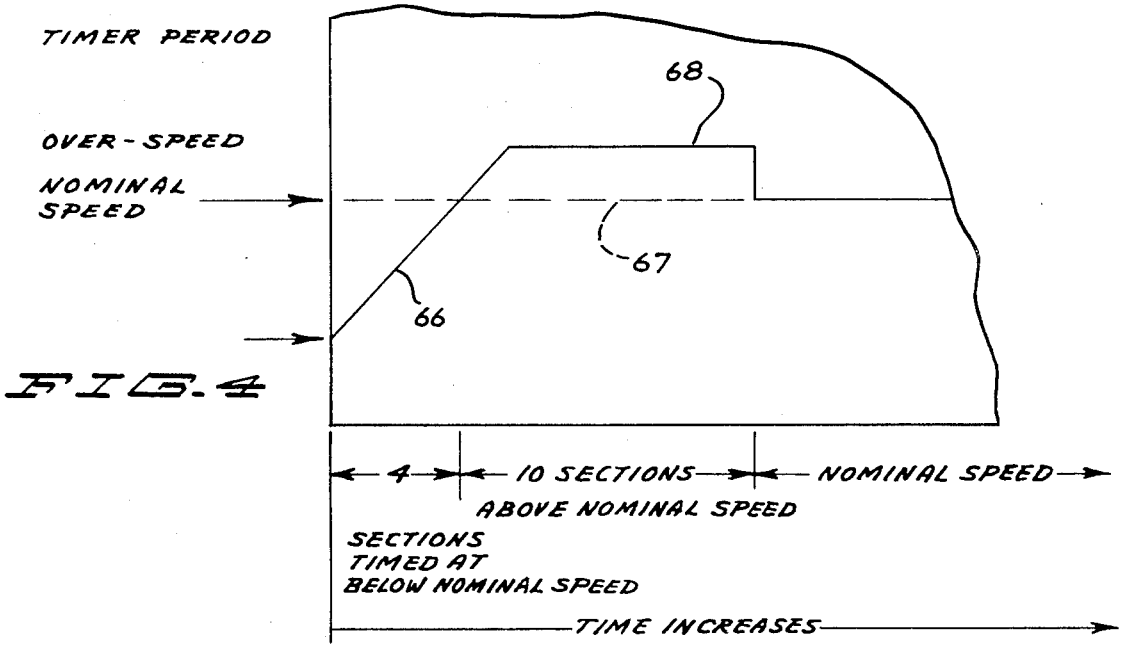
FIG. 4 is a schematic representation of a graph showing the speed control function at different sections of the guideway of the present invention in relation to a vehicle on the guideway.

Referring first to FIG. 1, a simplified layout of a typical guideway assembly and vehicle arrangement with which the present invention is utilized is shown. It should be understood, of course, that the preferred embodiment discloses merely one form of vehicle and track or guideway assembly which can be utilized with the present invention. Other guideways, or other types of vehicles, including trains as explained subsequently, can be utilized, and advantageously use the principle of the speed and spacing control herein described.

A guideway illustrated generally at 10 includes a pair of upstanding guide walls 12,12 and a transverse support wall 13 extending between the guide walls. Underneath the support wall 13 a second wall 14 is formed to form a plenum chamber 15 that carries levitation air under pressure from an air pressure source (not shown).

The floor 13 has a plurality of cruise or levitation valves 11 therein, and in the center of the guideway there are a plurality of thruster valves or thrust section valves illustrated generally at 16. The valves 11, and if desired the valves 16, are of the type generally disclosed in U.S. Pat. No. 3,685,788, Issued Aug. 22, 1972. The thruster valves 16 are provided with nozzles which provide a thrust to a vehicle over the valves, while the cruise valve or levitation valves 11 are made so that the outlet opening provides very little propelling force.

The valves are normally automatically opening in response to a pressure signal from a levitated vehicle as shown in the aforesaid U.S. Pat. No. 3,686,788. Each of the valves is locked into place in the deck 13 as shown in that patent application and controls flow of air under pressure from the plenum 15 to the plenum chamber formed under vehicle 25. In addition these valves can be opened at any time or held closed when a vehicle is above them by control signals which can be carried by compartmented ducts 17 and 18 as shown and explained in U.S. Pat. No. 3,685,788, which is incorporated herein by reference. For control of speed the guideway is divided into sections, and the valves in each section are ducts 17 and 18 respectively open to a separate compartment so signals in the duct can either keep the valves closed by placing pressure control signals on the valves, open the valves at anytime by use of a vacuum control signal, or permit the valve to respond automatically to the presence of a vehicle and open when a levitated vehicle pressure signal is present above the valve. A plurality of control conduits shown typically at 21 and 22, respectively, are used to carry pneumatic pressure signals to the valve control compartment in ducts 17 and 18 for various functions.

The guideway or track 10 is made to provide guidance for the vehicle 25, which is shown as a passive vehicle meaning that there is no on board power supply. The vehicle 25 can have suitable walls, doors and seats for carrying passengers in a system or for transporting freight. The vehicles 25 have plenum chambers underneath, and the levitating valves 11 and thrust valves 16 are automatically operated in response to pressure signals so that they open when a vehicle having levitation pressure underneath the vehicle is in the area of the valve. The plenum chamber design is preferably of the "bag seal" type of the type generally shown in U.S. Pat. No. 3,321,038. In this instance, usually there are four or more plenum chambers formed with separate flexible bag seals that inflate when they are under pressure, and which permit a small amount of air to escape from underneath the vehicle, but keep the vehicle levitated.

In a usual system, a length of the track 10 is used, and the vehicle will be levitated by the levitation valves 11, and the additional thruster valves 16 which provide a thrust to the vehicle to propel it forwardly so that there is air levitation and propulsion. The air pressure and power source is completely apart from the vehicle. The number of thrust valves 16 used can be varied as desired, and some of the cruise valves can also supply thrust for normal speed operation with the separate thrust valves used only when the vehicle is too slow. The thrust valves here are shown only schematically and of course the vehicle can have thrust reaction devices or vanes thereon to aid in propulsion. Also, special thruster sections such as those shown in U.S. Pat. Application Ser. No. 90,257, Filed Nov. 17, 1970, now U.S. Pat. No. 3,718,096 for "Vortex Thruster For Fluid Propelled Objects" can be used.

In transportation systems, where there is a long track or guideway and a number of individual vehicles are operating along a length of track between passenger stations, or vehicle berths, or, where there are a plurality of trains of vehicles each made up of a plurality of vehicles coupled together, it becomes important that a proper spacing between the moving modules whether an individual vehicle, or a train of coupled vehicles is maintained. Also for efficiency it is necessary that the relative speed of each of the modules, whether it is an individual vehicle or a train, is kept within a desired design limit in order to maximize the utilization of the guideway installation and move a large number of people in a short space of time. When the vehicles are automatically operated as in the present device, with no on board controls for power to the vehicles, it means that the control devices may be track located and used to actuate other devices to insure that no accidents occur. The vehicles in the form disclosed play an essentially passive role in controlling their spacing and speed. While in the form disclosed the thrust and levitation controls come from track or guideway based valves, it is desirable in some instances to utilize on board power for thrust and levitation of the vehicle which can be controlled by signals from the track by suitable means. The latter control system is still track based, utilizing vehicle sensors and other control modules to insure that there are no accidents.

In accomplishing the purposes of the present invention, the guideway used with the vehicle system is divided into a plurality of guideway sections. This sectional system is the basis for controlling both the speed and spacing of the vehicles. FIG. 2 shows a schematic representation of a length of guideway that represents the sectional system layout.

In FIG. 2 individual sections are marked off and numbered for reference purposes. The vehicles as disclosed, are made to be just slightly longer than an individual guideway section. The section length can be selected as desired, however, and in the form shown, each of the sections is 13¾ feet long, so that four of the sections amount to 55 feet in length. The vehicles, for example could be 15 feet long in this arrangement.

The nominal track speed selected for movement of the vehicles for illustrative purposes is 30 feet per second. The vehicles are provided with under the surface brake skids so that if the vehicle delevitates because the levitation and thruster valves are shut off the skids will engage the top surface of deck 13 of the guideway and will slide to a halt. If 0.3 co-efficient of friction between the vehicle brake skids and the guide-way operating surface is provided, at 30 feet per second velocity a vehicle requires approximately 46 feet to stop. Thus delevitating the vehicle is a means of applying a braking force to the vehicle.

Each of the sections of the guideway, which are 13¾ feet long, generally has a vehicle detector at the first end thereof in relation to normal direction of vehicle movement. The sections shown are numbered 32 through 56. This vehicle detector is for each section designated with an A suffix and there is a separate vehicle detector at the start of each of the sections. The detector 53A is shown at the starting line of the section 53, and there are detectors 52A, and 54A, and a separate detector for each of the sections. As shown schematically, a lead vehicle 57 is entering the section 53, and has just intercepted the detector 53A. The vehicle is traveling in the direction as indicated by the arrow 58. A following vehicle illustrated at 59 is also being controlled by the overall speed and spacing system, and has just entered into the section 44, and of course this has tripped the vehicle detector 44A.

The vehicle detectors are shown schematically in FIG. 2. They can be any type of detector such as a photocell, an electrical trip signal, magnetic signal, radio frequency signal or pneumatic signal. The vehicle detectors are mounted on the track or guideway, and are made so that the presence of a vehicle will cause a signal output from the detector for control purposes.

FIG. 3 shows a pneumatic vehicle detector in perspective view. The guideway side wall 12 has a small opening 60 therein through which a pneumatic nozzle 61 protrudes, and a jet of air indicated at 62 is directed toward a vehicle detector member in this case 53A. The detector member has a center recess 62A with a sender nozzle 63 on one side thereof, and an aligned receiver 64 on the opposite side thereof. A jet of air indicated at 65 is normally emitted from the nozzle 63 toward the pressure receiver 64, but the jet of air indicated at 62 strikes and deflects the jet of air 65 so the air from nozzle 63 does not strike the pressure receiver 64. When there is no vehicle over a detector the receiver 64 receives no pressure. When the vehicle is in place over the detector, the jet 62 is interrupted by the presence of the vehicle. The nozzle 61 is placed so the air jet from it will strike the vehicle. The jet 65 will then strike the pressure receiver 64. The vehicle detector as will be more fully explained, will be activated to deliver an output pressure signal in a pneumatic system which can be utilized to control speed and spacing of following vehicles. The vehicle detector can take any number of desired forms for electrical or hydraulic actuation. The pneumatic system shown is a simple fluid amplifier type of system to deliver a pneumatic output when a vehicle is detected at the beginning of each of the guideway sections. The source of air pressure for both the jet 62 and jet 65 are from the pressure source for plenum chamber 15 so that no other external air needs to be provided.

The basic speed of the vehicle 57, for example, is determined by the thrust that is provided by the thruster valves. In normal operation the levitation valves will be automatically operated to keep the vehicle levitated unless an emergency stop is indicated. The speed can be controlled by either turning on the thruster valves, in any particular section of the track as the vehicle traverses a guideway section, or leaving the thrust valves off during the time that the vehicle is traversing a section of guideway. In order to accomplish thrust control, a separate timer is associated with each of the respective guideway sections. The timer has an output signal during its time period and if the time period lasts longer than the time interval of vehicle transit from the detector which started the timer to the detector of the guideway section associated with the timer, the output signal is used to inhibit the thrust valves on that guideway section.

As shown schematically in FIG. 2, a timer 55B is started at the time the detector 53A is tripped. Thus the timer two guideway sections ahead of an activated vehicle detector is the one started, each time a vehicle trips or activates a vehicle detector such as 52A, 53A, or 54A. Again it is to be remembered that each of the guideway sections has a separate vehicle detector associated therewith.

The vehicles 25 are designed to be traveling at a desired nominal speed, as previously stated, for example 30 feet per second. Therefore the time for a vehicle, moving at its nominal speed, to go from the vehicle detector 53A to the vehicle detector 55A is known. The nominal value of the timer period of the timer 55B (the elasped time that it normally counts) will be the same as the time necessary for a vehicle at its nominal speed to go from detector 53A to detector 55A. If the timer time period has not run out before detector 55A is activated, the timer signal is used to inhibit the thrust valves in section 55 of the guideway. This means that the lead vehicle 57 will not receive additional thrust in section 55, as long as the vehicle is running at its nominal speed or faster. This lack of additional thrust will cause a vehicle to slow down slightly, and if necessary further speed corrections can be made as the vehicle traverses the next guideway section. For instance if the vehicle runs below nominal speed, the timer period will have run out and thrust will be provided in that section to speed up the vehicle. The timers associated with each of the guideway sections are sequentially initiated by the detectors two sections upstream. The time period for the timers are varied to accomplish directly the proper speed and indirectly the spacing of vehicles.

When the lead vehicle 57 enters the guideway section 53, and detector 53 A is initiated, the vehicle 57 will actually be occupying the track section 52. The next four track sections to the rear of track section 52, namely sections 48, 49, 50 and 51 will receive a signal from detector 53A that inhibits both the cruise and the thrust valves in these sections to stop any vehicle which enters these sections. If a wheeled or tracked vehicle was controlled the brakes would be applied. When the valves shown in U.S. Pat. No. 3,685,788 are used, a pneumatic pressure signal from the vehicle detector 53A is introduced into the proper compartments of ducts 17 for the cruise valves and in the proper compartment of duct 18 for the thrust valves to keep the valves in a closed position by applying a pressure signal on valve control diaphragms shown and explained in U.S. Pat. No. 3,685,788. This prevents the valves from automatically opening even if a vehicle is detected by the sensing port of the valve, which normally would cause opening. Thus, the four guideway sections trailing the occupied section is termed a " stop block" and is indicated in FIG. 2. This is a digital four (or other selected number) section block that follows behind a vehicle as the vehicle intercepts each equential vehicle detector. For example, when the vehicle detector 54A indicates that the vehicle 57 (as shown the lead vehicle) has reached the track section 54, the stop block would then become sections 49, 50, 51 and 52. The use of the stop block is made to insure that if a following vehicle such as 59 comes too close to the lead vehicle, all levitation and thrust air will be denied the vehicle. The vehicle will come to its stop against the track surface on brake skids provided on the vehicles. The stop block, which comprises the four guideway sections behind a vehicle (or a train if trains are used) is part of the spacing control system.

After the stop block, which is on a digital basis, has passed a particular track section, the timer that is tripped by the detector associated with the guideway section that is the last section in the stop block, for example as shown in FIG. 2, the timer 50B, receives a signal from detector 53A and a mechanism or device is utilized for adjusting the time period of the timer 50B for a longer time period than the normal time period. The time period of the timers actuated by detectors for four (or other selected number) guideway sections behind the stop block have their time period set longer than normal. This means that in the guidway sections associated with the timers tripped by detectors 44A –47A, which are timers 46B – 50B, the vehicle speed has to be slower than nominal or else thrust will be denied when the vehicle reaches the corresponding guideway section. Each timer of each section in the slow block has a different time setting, varying from the time for the slowest desired vehicle speed at timer 50B to the time for nominal vehicle speed at timer 46B. The speed of a vehicle in the slow block just short of the stop block would be controlled to the minimum desired speed of 28 feet/sec., as disclosed. As the forward vehicle (traveling at a nominal 30 feet/sec.) moves away from the trailing vehicle (traveling at 28 feet/sec.) the trailing vehicle moves farther back in the slow block where the timer periods are set for a time period to provide a higher vehicle speed. The vehicle will then speed up to its now speed setting. However this speed is still below nominal, so the trailing vehicle will still fall further behind the lead vehicle. This action repeats until the trailing vehicle reaches the position where the timers are set for nominal speed, then both vehicles will travel at the same speed and maintain fixed spacing.

Then, for 10 sections behind the slow block there is a "overspeed block" as shown ranging from sections 34 through 43. The timer in each of these track sections which is activated by detection of a vehicle is set for a shorter time period than the normal time period. This time period is also set in response to a vehicle detector signal ahead (upstream) of the timer so that the adjusted time period is in effect after the passage of the stop block and slow block. For example the timer 42B will be set for a shorter time period than the timer 55B (if 55B is at nominal time), and it will be set so that if the vehicle which starts the timer 42B by tripping detector 40A is not going at least 32 feet per second (which is over the nominal speed of 30 feet per second in the example given) the thrust valves for the block 42 will be initiated when the vehicle reaches section 42. This speeds up the vehicle slightly and keeps it from dropping back farther from its desired spacing. A following vehicle that is close enought to a leading vehicle to be underits influence will therefore follow a lead vehicle just ahead of the overspeed block and near the rear or trailing end of the slow block.

The timers for each of the sections behind the overspeed block will be set for their nominal time period, just as timer 55B, and a vehicle that is behind the overspeed block is not influenced by a leading vehicle, and of course is not close enough to a lead vehicle to be in danger of collision.

The means for changing or adjusting the time period of the timers operation on an elasped time basis. In other words, the adjusting means will set the timer time period to be longer than normal for a length of time equal to the time necessary for a vehicle to traverse four guideway sections at its nominal speed. Thus if the nominal speed is 30 feet per second, and the four guideway sections comprise 55 feet, as explained, each of the timers would be set to have a time period longer than normal for slightly less than 2 seconds. Then, if the nominal vehicle speed is again approximately 30 feet per second, for the next five seconds, approximately, the timer period is shorter than normal so that if the vehicle did not travel at a higher speed when under control of the shorter period timer, it would receive thrust. After that, the adjustment device for the timer period returns to its normal condition for any additioal vehicles. Instead of changing the timer time period setting on a time basis, the setting device for the timer time period may also be changed in response to vehicle position relative to the guideway section associated with the timer using vehicle detectors to adjust the timer period.

It is in this manner that the spacing of the vehicles is maintained. The graph in FIG. 4, shows the vehicle speed graphically on a time elapsed basis from the time the timer period setting device is tripped. The timer period function inversely follows the speed (the shorter the time period, the greater the speed). The timer period is a decreasing function vertically on the graph.

As shown in FIG. 4, for the four sections immediately after the "stop block" the vehicle speed will be held below nominal speed, and is indicated by the graph line 66. The speed increases (time period shortens) with an increase of time. The nominal speed line is indicated by the dashed line 67. The vehicles will travel at over nominal speed for the next ten sections of the guideway and this line is indicated at 68. Along line 68 the time period of the timers will be shorter so that it will in effect require the vehicles to be going faster in these sections. Then the timed speed will drop down to the nominal speed after the overspeed section has passed.

In FIG. 5, a logic diagram is shown for the system in connection with valves for section 53 which is triggered by the signal from detector 51A. The overall control is generally shown in FIG. 5 and includes a start-stop module 72, a timer module 53B, a vehicle detector module 55A and when there is more than a single vehicle, a train module 73 is connected into the system to prevent stopping of the vehicles that are immediately behind the lead vehicle in the train. The control port of the cruise valves in section 53 are represented by a symbol shown at 53C, and the control port of the thrust valves are represented by a symbol shown as 53D. Again, the cruise valves are utilized for levitating the vehicle and the thrust valves are used for accelerating the vehicle up to the desired speed, or could be used for decelerating the vehicle if they are oriented to provide deceleration.

In the automatic control system which is to be described as a preferred form of this system It should be noted that the pneumatic signal along the line 74 leading to the cruise valves or along the line 75 leading to the thrust valves will inhibit these valves to prevent them from operating.

Because the device under consideration here is shown in connection with the track section 53, timer 53B is shown. The timer 53B was started when vehicle 57 tripped detector 51A.

The start-stop module 72 is a control that is utilized to insure that the cruise valves for section 53 are inhibited, and also that the thrust valves in section 53 are inhibited when there is the presence of a vehicle detector signal in any one of the four sections (55, 56, 57, 58) of the guideway ahead of the unit. In other words when the section 53 is part of the stop block, the cruise valves will be inhibited.

Further, the start module is utilized to restart a vehicle if the vehicle has been stopped on the track, for example, if the vehicle enters the stop block and delevitates. Because the valves used open in response to a pressure signal under the vehicle, when the vehicle delevitates this signal is gone and the valves will not reopen unless independently operated. The start module supplies a negative pressure signal to the control diaphragm of the levitation (cruise) valves to open them and start the vehicle.

The start-stop module 72 includes a four input OR gate 76 which receives signal inputs from the vehicle detectors 55A, 56A, 57A and 58A and the input lines are labeled 55AL – 58AL for identification. The OR gates used here are designed to take pneumatic signals from these detectors, and if there is a signal from any one of the coupled detectors, the OR gate 76 delivers an output along a line 204 through a fluid amplifier valve 78 and line 77 to inhibit the cruise valves 53C and as will be explained to also act to inhibit the thrust valves 53D in associated with components forming a part of the timer module.

The fluid pressure signal from detector 54A on line 54AL, indicating a vehicle at the start end of guideway section 54, goes into an OR gate 79. All of the signals referred to are fluid under pressure in the form shown. Also, the output of the detector 53A is connected with a tube or line 80 to the second input of OR gate 79. The OR gate 79 is connected to a time delay mechanism 81 of suitable form which operates through an amplifier 82 to energize a venturi arrangement 83 to create a vacuum that will be passed along line 77 to cause the cruise valves 53C to open after the preselected time delay has passed if a signal is present on line 54AL or line 80 (and if there is no input to OR gate 76). The inputs to OR gate 76 override any start signal from the venturi arrangement.

The timer module 53B includes a basic timer means, along with its variable set point mechanism which is shown schematically at 87. The signal from the detector 56A is transferred with a line 90 to the input of the basic timer 87, and this signal on line 90 starts the timer variable set point into operation as will be more fully explained. The tripping of the timer 53B to set the timer running is down by a signal along a tube or line 51AL that is the output of the detector 51A at the time the vehicle 57 passes the detector. During the time period of the timer, the timer has an output pressure signal along the line 92 that goes into an OR gate 93. The other input of the OR gate 93 is the output of the AND gat 85, and the output of OR gate 93 is also connected to one input of the AND gate 85. It should be noted therefore, that if detector 53A has an output along line 80, it will pass through OR gate 79, and will also deliver a signal along line 84 to one input of the AND gate 85. Thus, if there is an output from the timer which is coupled to the other input of AND gate 85, (meaning the time period set has not elasped) there will be an output from the AND gate 85 along a line 95, and this will go into one input of an OR gate 96, through an amplifier 97 to the thrust valves 53D to inhibit these thrust valves. The inhibit signal will remain because AND gate 85 will continue to deliver a signal until detector 53A or 54A is no longer actuated because the output of AND gate 85 locks the AND gate through OR gate 93. However, if the timer period on timer 87 has elasped, there will be no output on line 92, and consequently the AND gate 85 will not have an output so that the thrust valves will not be inhibited, but will actuate to provide thrust to the vehicle in a normal manner.

The inhibiting signal from the OR gate 76 that goes through amplifier 78 also enters OR gate 96, so that if there is an inhibit signal either because a vehicle is in the "stop block" which is evidenced by the presence of signals from the detectors 55A – 58A on OR gate 76, or if there is a signal present from the AND gate 85, the thrust valves 53D will not actuate.

It should be noted that the timer varying set point cycle 0 is initiated to be effective for vehicles in guideway sections after the dead block for a leading vehicle has passed. For example, the timer 87 of module 53B will be tripped by a signal from detector 51A, and therefore the adjustable set point cycle for this timer 87 of section 53 is commenced at the time that detector 56A is tripped. A vehicle being timed by timer 87 is at least four unoccupied guideway sections behind the vehicle that tripped the detector 56A and thus is behind any stop block. The timer whose time period is being adjusted is two sections ahead of the end of the stop block, because the vehicle being controlled is still two sections away and out of the stop block.

The detector 53A signal, in addition to being passed along line 80 is sent through an output line 100, and can be directly applied to OR gates such as OR gate 76 and the OR gate 79 in control modules for dead block behind vehicle 57. For example, the output of detector 53A goes to the start stop modules in sections 48 through 52. The output line 100 also is connected to the set line in the timer 55A to commence the basic time period running for this timer.

When a train of vehicles is utilized, a train module illustrated at 73 is used which includes a blocking gate 101 that receives a control signal from the detector 52A so that as long as there is a signal at 52A, the stop block signal cannot be passed rearwardly along line 101A. If the module is a train of vehicles, the stop signal would continue to be present until the train had cleared the detector 42A, at which time the signal from the detector 53A can be applied to the sections at the rear of the train for the stop block behind the train. A line 102 may also carry a signal from the detector 53A to the OR gate 79 of section 54 and the other line shown branching from line or tube 100 can be used for tripping the timer 55B.

If the vehicles are substantially shorter than the guideway sections, then more than one vehicle detector must be used in each section. This alternate connection is shown by dotted connection in FIG. 5. The boxes shown at 91 represent three vehicle detectors for the same guideway section which deliver their output signals into a three input OR gate 91A which would alternately supply the pressure signal for lines 80 and 100. A signal from any of the three detectors connected to OR gate 91A would provide the detector signal in place of the detector 53A. This would in effect couple each detector 91 with the other detectors in the guideway section so that at least one detector 91 would provide an output for lines 80 and 100 as long as the shorter vehicle was still in the guideway.

Figure 6:
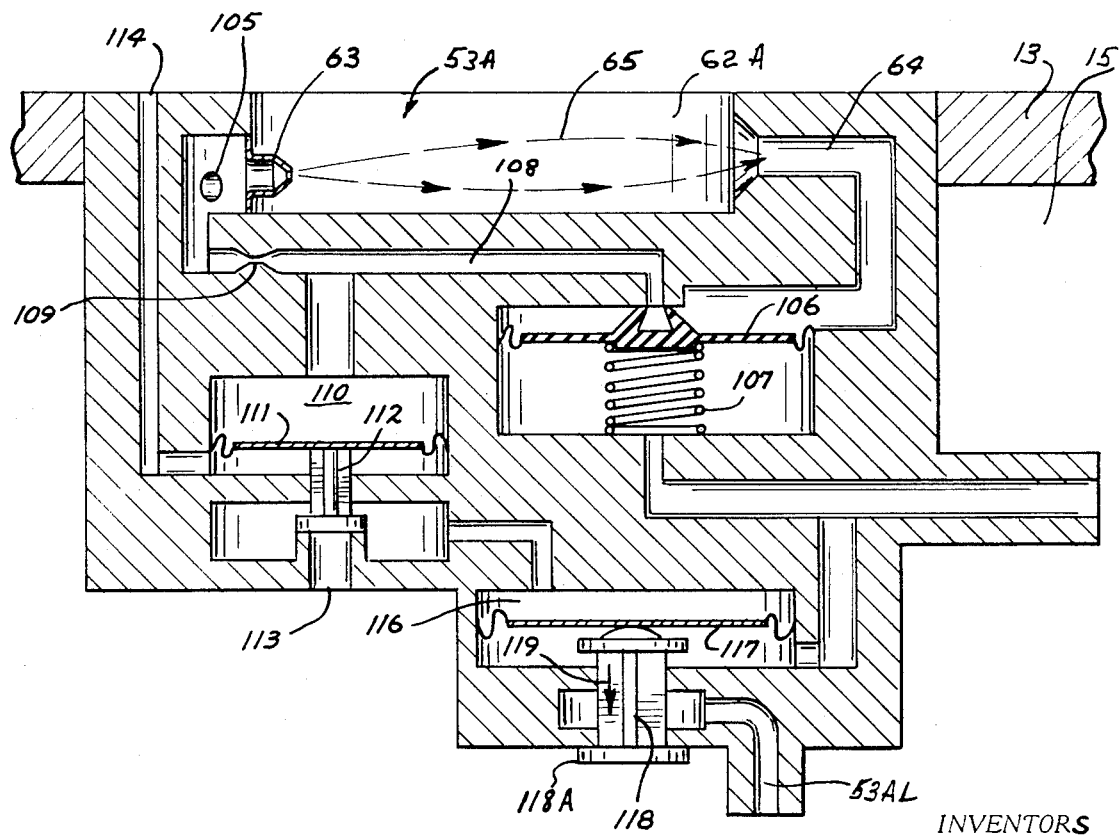
FIG. 6 is a cross sectional view of the vehicle detector shown in FIG. 3.

In FIG. 6, a sectional view of the vehicle detector, for example 53A is shown. The deck 13 is shown in place, and the detector 53A has a recess with the nozzle 63 at one side thereof. The nozzle 63 provides air in a jet indicated at 65, that is directed across the recess toward the pressure receiver port 64. The nozzle 63 is supplied with fluid under pressure through a passageway 105 that is open to the plenum chamber beneath the deck 13. This constant source of air in the plenum chamber supplies the jet 65 through the nozzle 63. When the jet 65 is diverted from the receiver by jet 62 (see FIG. 3) the device is in the state as shown in FIG. 6.

When the jet 65 is not striking the pressure receiver, a diaphragm 106, which is made to divide an internal chamber in the detector, is biased with a spring 107 to close off a passageway 108, that is open through a restriction 109 to the pressure passageway 105. A chamber 110 is pressurized on one side of a diaphragm 111 through restriction 109 so that the diaphragm biases a headed valve 112 (as will be shown typically later) to keep a passageway 113 leading from the plenum chamber 15 closed off. It should be noted that a passageway 114 is provided to the upper surface of the deck 13, so that the signal pressure underneath the levitation pads of a vehicle also acts on the bottom of diaphragm 111. When a vehicle is over the detector unit, the jet 65 is permitted to go into the pressure receiver 64, which pressurizes the chamber of the pressure receiver, and moves the diaphragm 106 away from the opening in the passageway 108, against the action of the spring 107. This reduces the pressure in chamber 110 and valve 112 opens moving the head away from the passageway 113, thus opening the passageway 113 to a chamber 116 on one side of a diaphragm 117 of an amplifier valve 118. This valve 118 will then be moved in direction as indicated by the arrow 119 (it previously will be closed because of plenum pressure on head 118A) and this then opens a passageway for fluid under pressure to come from the plenum chamber or duct past head 118 out through the output line 53AL of the vehicle detector 53A. It is this output from line 53AL that provides a pressure signal to indicate that the detector has detected a vehicle above it. This pressure signal is used, as shown in the logic diagram of FIG. 5 in the line 100 and line 80. This is a typical vehicle detector, and the output signal comprises a fluid flow under pressure used as a signal to activate further modules as described.

Referring now to FIG. 7, an example of a specific timer module 53B is shown part schematically. The components that are shown in FIG. 7 and also shown in FIG. 5 are numbered alike.

The timer is shown in its rest position and is basically composed of a monostable multivibrator (which is a one shot), an AND gate, the input from two vehicle detectors, the output of the timer to the thrust valves (or the OR gate 96) and the signal line for starting the variable time sequence (set point signal 90) together with the associated mechanism for varying the time of the one shot. The one shot is composed of two inverting valves, three diaphragm swept volume chambers, which may be referred to as pneumatic capacitors, an OR gate, and the necessary bleed, orifices and check valves. This is a fully pneumatic timer, and of course there are electronic equivalents as well as mechanical equivalents which have variable periods of time to which they can be set.

The basic timing diaphragm swept volume timer housing is shown at 125, and comprises a housing having a diaphragm 126 extending thereacross, forming two chambers and having a first input line 127 and a second line 128 leading therefrom. The line 128 has a restriction orifice 129 at one end thereof, and this orifice is open to duct pressure, or in other words to a source higher than atmospheric pressure. In addition, the line 128 is connected into a line containing a restriction orifice 130 that leads to atmospheric pressure at its outer end. A line 128 also opens to a control housing 131 that has a diaphragm 132 dividing the base of the housing into two chambers, and the chamber on the side of the diaphragm 132 opposite from the opening through line 133 (which is connected into line 128) is open to atmospheric pressure through a passageway 134. Diaphragm 132 is attached to control sliding valve 134A, which is shown typically in FIG. 7B, that seals around an opening 136 leading to duct or plenum pressure. It should be noted that when the plenum chamber 15 is pressurized, these openings can merely be open right to the duct pressure. Thus, in the quiesent or at rest stage of the timer, the valve 134A is held closed by the pressure on diaphragm 132 set up by the ratio of orifice or restriction 129 to restriction 130. The output line 92 as shown in FIg. 5 leads from the chamber 137 in which the valve head 135 operates.

A further control of the timer is a valve housing 140, which has a first chamber 141 and a port or passageway 142 leading from duct pressure into this chamber 141. Flow through the passageway 142 is controlled by valve 143, and the line 127 to the basic timer housing 125 is connected to chamber 141 to carry the pressure coming through the passageway 142 to the basic timer housing when the valve is open. In its quiesent stage, as shown, the valve 143 is open, and this seals off the passageway for the valve phank so that fluid under pressure cannot flow down into the second chamber 144 of the housing 140. Second chamber 144 is divided with a diaphragm 145, and on one side of the diaphragm 145 there is a passageway 146 leading to atmospheric pressure. On the opposite side of the diaphragm 145 from the valve 143, there is a shuttle valve or "OR gate" illustrated generally at 147. The shuttle valve is typical of the OR gates shown schematically in the logic diaphragm of FIG. 5. As shown typically in FIG. 7A, the set input line 51AL and a second line 148 are aligned axially, and each has small guide knobs 149 and 150, respectively, adjacent their ends. A small disc 151 mounted onto a shaft 152 that is slidably mounted in the ends of and is guided by the knobs 149 and 150. The disc or button 151 can thus slide axially to close the opening to either tube or line when a fluid under pressure flows into chamber 144A from the other tube.

Just by way of example, when fluid under pressure comes in through the line 51AL from a vehicle detector that trips the timer, a button 151 would slide to the left as shown in FIG. 7 and 7A to close off the opening to the tube 148, and cause pressure to rise in chamber 144A and act on the diaphragm 145 moving the valve 143 upwardly so that the head of the valve 143 closes off the passageway 142. The line 148 is turn is open through a check valve 153 to a diaphragm formed chamber which will be more fully explained.

In the at rest stage, however, as shown in FIG. 7, the input through line 51AL is zero, and its output through line 127 is high, moving the diaphragm 126 in the basic timer housing 125 all the way to the end of its movement. The basic time period of the timer is controlled by movement of diaphragm 126 and its effect on valve 134A.

Varying the time period for diaphragm 126 to sweep across timer 125 is accomplished as shown with a pair of housings having sweep diaphragm chambers that are connected to the line 128. As shown, a line 157 is open to the line 128, and a restrictive orifice 158 is contained in this line. This orifice 158 can be of any usual or suitable design as desired. The line 157 leads directly into a chamber 159 formed in a housing 160 having a sweep diaphragm 161. An additional branch line 162 is connected to the line 157, and has a restrictive orifice 163 therein. The line 162 leads into a chamber 164 of a housing 165 which has a sweep diaphragm 165A and a spring 166 between the top of the housing and the diaphragm 165A in the chamber 164. The chamber 164 is also connected through a check valve 167 and a tube or line 168 to the set point line 90. The set point line 90 is the line leading from the detector 56A three sections ahead of the section 53. The line 90 opens through a check valve 169 to a chamber 170 which is on the opposite side of the diaphragm 161 from the chamber 159. Also, it should be noted that the line 148 is open through check valve 153 to this chamber 170, and a restrictive orifice 171 is provided leading from the chamber 170 to atmospheric pressure. The check valves here are shown merely as hinged gates over the ends of the tubing or lines utilized, but could be any desired check valve.

In addition, it should be noted that the line 148 is connected into the tube or line 92 so that the pressure output of the chamber 137 is felt both at line 148, and the OR gate 147, as well as through the line 92 to the OR gate 93.

The entire timer component is used in the timing circuit with an AND gate, coupled to an OR gate. The AND gate is shown at 85, and the input from line 84, which comprises the output of the OR gate 79 is applied to the input of AND gate 85 through a valve 175, which controls flow into a chamber 176 and thus through a line 177 back to a chamber 184 that is formed in the housing 179 with a diaphragm 180. This chamber 184 is part of OR gate 93. A chamber 178 on the opposite side of diaphragm 180 is open to atmospheric pressure through a passageway 181. A valve head 183 can move to permit or to close off, flow between chamber 176 and 178. Chamber 184 is an OR gate chamber for OR gate 93 which comprises a shuttle valve, including a disc 185, moving between the end of tube 92, and the end of tube 95. The tube or line 177 connects into the line 95. The AND gate will lock on because of the feedback signal through line 177 to OR gate 93.

The typical valve construction is shown in FIG. 7B and shows how the shanks of the valves are made to permit flow of fluid along the shanks. For an initial examination of the operation of the timer, the restriction or orifice 158 is assumed closed. Also assume for the first discussion that the check valve 153 is held closed to prevent the output of chamber 137 from entering the housing 160. When a vehicle detector puts in a pressure signal or sustained pressure along line 51AL, this starts the timer running. The OR gate disc 151 will close against the end of tube 148 and the diaphragm 145 will be actuated to lift the valve 143 and close off the passageway 142 leading from duct pressure. The output of fluid under pressure through line 127 is thus reduced to zero and the diaphragm 126, which has been in the position shown in FIG. 7 starts to move toward the end of tube 127 because of pressure coming in through restrictive orifice 129. The pressure then in tube 128 actually reduces substantially to zero from duct pressure which had built up in the tube 128 through orifice 129 and at this stage there is essentially no flow in the orifice 130.

This reduces the pressure on diaphragm 132 because of the connection through the tube 133, so that the valve head 135 moves away from position closing off the passageway 136, and letting duct pressure flow through chamber 137, and into line 92 and line 148. The head 135 seals off the chamber 137 on the valve side of diaphragm 132 to lock on the OR gate through line 148 and hold valve 143 closed if the pressure signal in line 51AL was only a pulse. This would move the disc 151 against the tube 51AL, assuuming that the signal in line 51AL was no longer present, and would hold the valve 143 closed because of the pressure coming from chamber 137 through line 148. Also, this pressure signal moves the OR gate 93 so that the disc 185 blocks off tube 95, and the diaphragm 180 is actuated to move the valve shank 182 upwardly, moving the head 175 away from the passageway surrounding the valve, and if there is a pressure signal in the line 84 from the OR gate 79, (which is made like the OR gate 93) this pressure signal would be carried through chamber 176 and tube 177 to lock the valve head 175 open. The pressure signal from line 84 will then appear on the line 95, and will be used to inhibit the thrust valves through the OR gate 96 and amplifier 97. The OR gate 96 includes a shuttle valve and is just shown as a block. The other input to the shuttle valve for OR gate 96 is the line 77. This shuttle valve in turn controls the amplifier valve 97 that controls flow of fluid from the duct pressure to the thrust valve inhibit controls. If no start-stop module is used with the system, the output of line 95 can be used to directly inhibit the thrust valves of the section that is being inhibited.

All this action is occurring while diaphragm 126 is moving toward tube 127. After the diaphragm 126 reaches the extent of its travel toward line 127, the pressure in line 128 will rise immediately, as will the pressure in line 133, causing the diaphragm 132 to move the valve head 135 up against the passageway 136 to close off the output from chamber 137. As soon as this output from chamber 137 is removed from the line branch 148 leading to the OR gate 147, if there is no longer any signal on line 51AL, the valve 143 will open and the output from chamber 141 will again go to duct pressure causing the diaphragm 126 to return to its solid line position. The time during which there is an output from the chamber 137, or in other words the time the valve 135 is away from the passageway 136, is the timing interval. It should be noted that the diaphragm 126 of timer housing 125 will not be reset even through the output from chamber 137 is low, if there is still a signal on line 51AL, until this signal is removed to permit the valve 143 to move to its solid line position so that duct pressure is applied through the tube 127 to the diaphragm 126.

The operation of the unit is much the same with the time period changing housings 165 and 160 added into the pneumatic circuit. In the pneumatic circuit, the restriction 158 prevents large increases in pressure at tube 128 from movements of the diaphragms in housings 160 and 165. The time of operation of the basic timer diaphragm 126 is dependent upon the position of the diaphragms in housings 160 and 165 and therefore the volume of air which these can transfer to housing 125.

With the line 148 connected to the line 92, when the output from chamber 137 is present, this fluid under pressure is applied through the check valve 153 (with check valve 153 operating normally) into the chamber 170 to move the diaphragm 161 toward the end of the tube 157 which is in the chamber 159. The diaphragm 161 is shown in its normal set point position, in other words in position for the nominal time for the basic timer 125. When the output through check valve 153 moves the diaphragm 161 toward the tube 157, there is a flow across restriction 158 and this flow is added into the chamber of housing 125 and helps to move the diaphragm 126 toward the tube 127 faster. The effective volume of housing 160 is normally 1/10th to 1/5th of the housing 125 so that the diaphragm 126 has not finished its travel when diaphragm 161 has finished its travel, but movement of the diaphragm 126 is initially speeded up. The restriction orifice 158 prevents the input pressure from diaphragm 161 acting on diaphragm 126 from increasing too much, which would actuate the valve 134 to close.

The position of the diaphragm 161 and the diaphragm 165A is determined by time. As shown the pressure signal has been removed from line 90, which is in turn a signal from a vehicle detector, as illustrated, for the section 56A. A sufficient time so the diaphragm moved to its normal position before actuation of the timer. Any pressure in set point line 90 will cause diaphragm 161 to be moved toward tube 157 and if the diaphragm 161 has not moved back to its normal position before the signal from line 148 is present the diaphragm 161 will provide less air to housing 125 than it does normally.

Thus, if the diaphragm 161 has been displaced toward the end of tube 157 by pressure in the set point line 90 at the time that the pressure appears on the line 51AL to trigger the timer, the time of operation for the diaphragm 126 will be a longer period of time than normal because there will be less air supplied by the movement of diaphragm 161 through housing 160 urging the diaphragm 126 to move. If the position of the diaphragm 161 is displaced toward tube 157 from its normal position and the time period of basic timer 125 is longer than normal and the vehicle will be controlled to run more slowly.

The housing 165 and internal diaphragm is used for speeding up the time period of the diaphragm 126 from its normal position, and this action is for control of the guideway sections comprising the "overspeed block". The outer surface of diaphragm 165A is open to duct pressure, and once a pressure signal is removed from the line 90, the check valve 167 of course closes, (as does the check valve 169) and the duct pressure acting on diaphragm 165A will tend to bleed any additional air in chamber 164 through the restrictions 163, and 158 and out through restriction 130. However, if the timer is triggered by a signal in line 51AL before the diaphragm 165A returns to its normal position, the diaphragm 165A adds air to the chamber in housing 125 and makes the diaphragm 126 sweep faster than normal to thus cause a faster or shorter than normal time period.

The recovery time for the diaphragm 161 to move to its normal position is determined by the restriction 171 and the pressure in line 128 because the check valve 153 will operate to close when output from chamber 137 is zero and diaphragm 161 moves toward normal position. The recovery time for the diaphragm 165A is determined by the orifice 163 and the pressure in line 128. The time for full recovery of the diaphragm 165A is relatively long, and is designed to be the time it normally takes a vehicle to run about 17 guideway sections at nominal speed. These sections are in the overspeed block of the spacing control.

Thus, where the signal from line 90 is present, the diaphragm 161 immediately moves to position with the diaphragm extended toward the tube 157, and the diaphragm 165A also is extended out from normal. As soon as the signal from line 90 is removed the diaphragm 161 moves toward its normal position. Additional variation in the time period of basic timer 125 can be made by other regulation of inputs or pressures, if desired.

The housing 125 and sweep diphragm 126 form a fixed volume quantity and by varying the pressures on the inlet or outlet of the housing the time period for sweeping the volume can be changed. The response with this type of device is immediate. The signal is sharply defined as either on or off.

A fully pneumatic start-stop module is shown in FIG. 8. If a vehicle is inhibited in the stop block wherein neither the levitation valves nor the thrust valves are actuated so that the vehicle will stop, some means of again levitating the vehicle is necessary. The vehicle and the valves utilized therewith, as shown and explained in connection with the valves described in U.S. Pat. application Ser. No. 37,691 require a levitation pressure signal for automatically opening of the valves. If the vehicle is delevitated completely, this pressure signal is not present, and when the stop block passes, the vehicle would not again normally start unless some means for doing so are provided.

As shown in FIG. 8, the OR gate 76 which was the four input OR gate, includes the input lines 55AL and 57AL, which carry the signals from detectors 55A and 57A respectively, form a two input OR gate using a shuttle valve 197 inside a chamber 195. The lines 56AL and 58AL carry the signals from the vehicle detectors 56A and 58A, into a chamber 196 having a shuttle valve 200 forming an OR gate.

The four input OR gate 76 then includes a pair of tubes 201 and 202, which are diametrically opposed, and lead from chambers 195 and 196, respectively. A shuttle valve 203 is positioned between the tubes 201 and 202 to form another OR gate. The OR gate 76 has four inputs, and a signal from any one of the input lines will actuate the OR gates so that there is fluid under pressure in the passageway 204 leading into fluid amplifier 78. The fluid amplifier includes a chamber 205 that is divided with a flexible diaphragm 206 that operates an inhibit valve 207, which has one head 208 that controls fluid flow through an opening leading from a duct pressure area 209. The stem of valve 207, has the same cross section as that shown in FIG. 7A, and extends across a passageway 210 that forms the outlet for the fluid amplifier and is connected with suitable conduits to the control ports of the valves to be controlled. Connection conduits open to the passageway 210 are conduits such as 21 and 22 shown in FIG. 1. In FIG. 5 the conduit is numbered 77. The valve 207 controls passage of pressurized air from the duct pressure chamber 209 into the passageway 201 and thus into the control conduits for the respective levitation and thrust valves. When the valve 207 is actuated because of the pressure of a pressure signal in any one of the lines 55AL through 58AL, the valve will be moved to position wherein duct pressure will be present in passageway 210, and the valves controlled thereby would be inhibited from actuating.

The valve 207 also has a head 212 that controls flow of fluid under pressure between passageway 210 and a duct 211. The duct 211 opens into an annular chamber surrounding a venturi 83. The venturi 83 opens to atmosphere through the deck 13, in the usual situation. Flow through the venturi 83 causes a negative pressure in duct 211, and thereby, when the head 212 is in its solid line position, a negative pressure in passageway 210. The negative pressure will cause opening of the valves to which the signal line or conduit open to passageway 210 is connected. The venturi is actuated through a start valve assembly illustrated generally 216. The start valve assembly includes the OR gate 79, having the input through a line 80, and the line 54AL which carries the signal from detector 54A in this example. The OR gate 79 again is the shuttle valve type, and is mounted in a chamber 218 that is open through a small orifice 219 in one wall that opens to one side of a spring loaded diaphragm 220 operating in a separate chamber. A check valve 220A permits the diaphragm 220 to move to its position as shown in FIG. 8 under the action of spring 220B when there is no pressure on either lines 80 or 54AL. The diaphragm 220 controls a valve member 221 that has a head 222 for preventing or permitting pressure to pass into the interior chamber 223 in which the valve 221 operates. Duct pressure is present in the area outside of the valve and surrounding the valve head 222. The orifice 219 acts as a time delay 81 so that even though a pressure signal may be present in either line 80 or 54AL, a time of actuation before the valve 221 is operated will permit a time delay between the appearance of a signal at line 54AL or line 80 and the actuation of the venturi 83.

Th lines 55AL through 58AL carry the stop block inhibit signals for the corresponding sections of track as described above, and if the vehicle detector 53A continues to supply a signal on line 80, after the time delay as the signal bleeds through orifice 219, the diaphragm 220 will move a sufficient distance to actuate the valve 221 so that the head 222 moves away from its closed position and fluid under duct pressure will be supplied into chamber 223 and will flow out through the venturi 83 causing a negative pressure in passageway 211. Assuming then that the stop block inhibit signals have been removed (lines 55AL – 58AL no longer carry signals), the valve 212 will be in its solid line position and the suction or negative pressure caused in chamber 211 will be applied through the passageway 210 to the valves on line 77 opening these valves and levitating the vehicle that is above the valves.

Again if there is an inhibit signal on or in passageway 210, or in other words a pressure signal coming from the chamber 209, this will also be supped to the OR gate 96 to inhibit the thrust valves 53D. When the signal on 54AL disappears the diaphragm 220 returns under action of the spring, because of a passageway 225 which leads to atmospheric pressure and lets the diaphragm move back through the check valve 221.

The train module 73 is shown in FIG. 9, and is merely an inhibit valve which prevents the output signal from the vehicle detector 53A along line 100 from being applied to the trailing guideway section controls, if there is also a signal at the vehicle detector for the guideway section behind the section on which the detector is being actuated. In this instance the inhibit signal comes along the line 52AL which leads from the detector 52A. Thus if there is a signal in line 52AL, it enters the chamber 228, and acts on the diaphragm 229 to move a valve 227 to block the pressure signal coming from the detector 53A through the line 100. When the inhibit signal from a trailing guideway section detector disappears, valve 227 will be moved to its solid line position as shown in FIG. 9 and the signal from the vehicle detector 53A will be applied through line 101A to the OR gate 76 in the start-stop module for the guideway section 52 making this section part of the stop block of guideway sections following a train of vehicles.

In FIG. 10, there is shown a schematic representation of an application of the speed and spacing control concept to a merge line setup, for acceleration guideway for starting a vehicle or merging two guideways, and also for a system where there are two intersecting guideways, so that proper control can be maintained to insure that there will not be any vehicle collisions. The schematic figure shows a vehicle illustrated generally at 230, positioned on a starting section 232 of a merging or acceleration guideway 231. The starting section could be, for example, a station berth where the vehicle 230 is being loaded. Ahead of the vehicle 230 in merging guideway 231, there are a number of guideway sections identically numbered with corresponding numbers so that of the main line guideway such as that shown in FIG. 2, and indicated in FIG. 10 at 233. In order to utilize the speed and spacing controls in the acceleration or merging guideway for length of each of the acceleration guideway sections, for example the sections 32M, 33M, 34M, 35M etc. are based on equal time intervals of vehicle travel in the corresponding sections of the main line guideway 233. For example, the length of time for the starting vehicle 230 to traverse the short merging guideway section 32M will be the same as the length of time for a vehicle moving at nominal speed to traverse the main line section 32. The thrust valves in sections 32M (which stands for merge), 33M, 34M, etc. have sufficient thrust to start the vehicle 230, and get it moving slowly. As a vehicle that is traveling on the main line moves along, a "stop block" "slow block" and "overspeed block" are following along as previously explained. The control signals that cause the "stop block" "slow block" and "overspeed block" are transferred with suitable pneumatic connections illustrated generally at 234 to corresponding sections of the merging guideway. For example, if the vehicle 57 is positioned at guideway section 52, which is right at the merge point, and is tripping vehicle detector 53A, as previously explained, this would insure that the stop block of sections 51, 50, 59, and 48 would be reflected into the sections 51M, 50M, 49M and 48M of the merge guideway. Likewise, the slow block would be reflected into sections 47M, 46M, 45M and 44M, and the vehicle 230 could be following in position along the slow block. Assuming that the vehicle is positioned on guideway section 43M and his tripped detector 44MA, the stop block behind this vehicle 230 would be reflected into merge sections 42M, 41M, 40M and 39M, and also reflected into the corresponding sections on the main guideway, to prevent any other vehicle on the main guideway from entering the stop block on the main guideway set up by vehicle 230 as it moves along. This keeps an accelerating, merging vehicle from merging into a main line vehicle, and also keeps a second main line vehicle, therefore, from merging into the rear of the accelrating vehicle on the merge guideway. Thus the detectors and other controls are present on the merge guideway just as they are on the main line guideway.

Also as a further function of the merging control, there has to be a sufficient opening or space on the main line guideway for the merged vehicle to enter into the track at the time it reaches the section 52 and still be behind a stop block of a lead vehicle and there should be space for a stop block so the merged vehicle doesn's stop a second vehicle on the main guideway. The section 32 is a position where the merging vehicle 230 can stay until detectors indicated generally at 235, which represent the number of vehicle detectors necessary to indicate a proper vehicle spacing, give a desired clear signal indicated at 236, to the control connections to the merging guideway. This then will also initiate the vehicle start control such as the venturi previously described to levitate the vehicle 230 and to start it moving along the track sections 32M – 51M. Again if there is a main line vehicle passing by, the controls are tied in with suitable connections into the merge guideway valves to insure that there is not a collision at the point of merger.

A further schematic showing of the pneumatic connections that are necessary for both the normal main line guideway and the use of the merged guideway, FIG. 11 is a schematic diagram showing eight conduits, which are represented by lines, for carrying all pneumatic signals to the guideways.

The vehicle detectors are indicated by the section number with an A suffix, for example 45A and 45MA for the merge track detectors. The output connections are indicated at 237, and the input connections are indicated at 238. The input connections go to control the thrust and cruise valves. The thrust valves are shown by a solid black arrow in the schematic drawing, and the cruise valves are shown by an open or unfilled arrow head. The six input lines to the input connections 238 are represented in FIG. 5, such as the four input lines leading to the OR gate 76, the line leading to the OR gate 79, and the line 80 which connects from the output of each vehicle detector to the input connections. The line 80 is labeled in FIG. 11, as is the line 100 which goes to the other output connections. The module in FIG. 11 does not show the train module. However this can be coupled in as desired or necessary. Only a typical showing is made. By connecting the conduits between the merge and main line guideways, the controls are reflected from each of the guideways back into the other guideways. The sections thus are tied together for positive control. In order to give the clear signal 236, the input lines from the required number of vehicle detectors in the track sections prior to the merge point are used in the control module 236.

If vehicle 230 starting out on the merge guideway fails to respond or move properly the merge vehicle can be aborted and stopped by use of a control 246 that disables all connections between the two guideways and disables all valves in the merge section. The control 246 can, for example, include a separate timer which is initiated when vehicle 230 is started to move and which is disabled when the vehicle 230 passed a merge guideway section, for example section 46M. If the timer period of the separate timer elapses before the vehicle reaches section 46M the disabling function of control 246 would occur and vehicle 230 would be stopped, or aborted. Also the controls 246 may be used to sound an alarm or indicator when a vehicle is aborted, and to keep all valves in the merge track disabled until the aborted vehicle is removed or restarted.

Referring also to FIG. 10, a right angle intersecting guideway 240 can be interlocked with the main guideway to control movement of intersecting vehicles merely by coupling the controls between the main guideway sections and the intersecting guideway 240, which are designated with the letter S. The interconnection would be as shown in FIG. 11 for the merging track.

The spacing therefore can be used for merging of crossing guideways as well as linear guideways, and of course the guideway construction is not critical to the invention. Tracks of or monorails also are meant to be included in the term guideway. Also the propulsion or thrust could be linear induction motors or other devices. In speed and spacing control the stop block signals and slow signals can also be used for reverse thrust or brakes. For example on a rail guided vehicle brakes could be applied if desired to control spacing.

The reference to line, conduits or tubes connecting the various operable pneumatic control elements is meant to refer to a suitable tubular connection that will carry the flow of fluid under pressure used as a signal.

The term vehicle module means either a single vehicle or a train of connected or coupled vehicles that may be treated as one vehicle for spacing purposes, that is, the stop, slow and over-speed blocks are maintained at the trailing end of the module.

Both the cruise valves and thrust valves are automatically open normally but can be inhibited or opened by signals on the lines 74 and 75 in FIG. 5. Pressure signals will inhibit the valves and vacuum signals will open the valves to supply or deny power to the vehicles.

What is claimed is:

1. A control system for vehicle modules comprising one vehicle or a plurality of connected vehicles movable on a guideway means, comprising means effectively dividing said guideway into guideway control sections including vehicle module detector means mounted on said guideway for each guideway control section to detect a vehicle module position related to its associated guideway control section, control means acting in response to said vehicle module detector means including means indicating the speed of movement of a vehicle module from a first vehicle module detector means to a second spaced vehicle module detector means in relation to a reference set point speed between said first and second vehicle module detector means, means to adjust the speed of vehicle module movement subsequent to movement past the second vehicle module detector means in response to the differencee in indicated speed and the reference speed of said means for indicating vehicle module speed, and means to adjust said reference speed in response to presence of a vehicle module on a preselected portion of the guideway means spaced in the direction of vehicle module movement from said second vehicle module detector means.

2. The control system of claim 1, and means acting in response to said vehicle module detector means to prevent a following vehicle module from advancing closer than a preselected number of guideway sections to a leading vehicle module comprising means to stop a vehicle module when it moves closer than said preselected number to a leading vehicle module.

3. The control system for vehicles according to claim 1, wherein said vehicle modules are levitated, and wherein means are provided for levitating and propelling said vehicle modules comprising normally automatically opening valve means in said guideway means for providing levitation fluid under pressure and propulsive fluid under pressure, and means to prevent a following vehicle module from advancing closer than a preselected number of guideway sections to a leading vehicle module comprising means to prevent levitation and propulsion fluid under pressure from being supplied to a following vehicle module closer than a preselected amount behind a leading vehicle module.

4. The control system of claim 3 wherein said means indicating the speed of movement includes timer means having a time period to provide the indication of the set point speed between the activation of the first vehicle detector means by one vehicle module and the activation of the second vehicle detector means spaced on the guideway in direction of movement of said vehicle module by said one vehicle module, means to normally supply propulsive power to said one vehicle module as it traverses the guideway, and means to prevent propulsive power from being supplied to said one vehicle module if said one vehicle module activates the second detector means before the time period of the timer means has expired.

5. A control system for vehicle modules comprising one vehicle or a plurality of connected vehicles moving along a guideway means, comprising means effectively dividing said guideway means into guideway control sections including vehicle module detector means mounted on said guideway for each section to detect a vehicle module position in relation to its associated guideway control section, control means acting in response to said vehicle detector means cooperating between the guideway means and the vehicle module to prevent a following separate vehicle module from advancing into a stop block comprising a preselected number of guideway control sections trailing a leading vehicle module, said control means including timer mans to time speed of movement of a vehicle module from one said vehicle module detectors to a second vehicle module detector in relation to a selected time period, said second vehicle module detector being a preselected distance from said first vehicle module detector and spaced in the direction of movement of vehicle modules, means to adjust the speed of said separate vehicle module in response to the differences between elasped time of the separate vehicle module travel between said vehicle module detectors and the selected time period, said timer means having an adjustable time period, and means to adjust the time period of said timer means in relation to a signal from a vehicle detector indicating the presence of a vehicle module in a preselected guideway section associated with each timer.

6. The control system of claim 5, and means acting between said guideway and said vehicle module to control propulsion of the vehicle module as it traverses a particular guideway section, and wherein said means to adjust the separate vehicle module speed in response to the time of travel thereof between said first and second vehicle detector means includes means to prevent propulsive thrust from being supplied to the separate vehicle module when the vehicle module travels between said detector means in less than a preselected time.

7. A control system for vehicle modules comprising one vehicle or a plurality of connected vehicles moving along a guideway means, comprising means effectively dividing said guideway means into guideway control sections including vehicle module detector means mounted on said guideway for each section to detect a vehicle module position in relation to its associated guideway control section, control means acting in response to said vehicle detector means to prevent a following separate vehicle module from advancing into a stop block comprising a preselected number of guideway control sections trailing a leading vehicle module, said control means including adjustable period timer means started by a signal from a first vehicle detector detecting said separate vehicle module to measure the time of movement of said separate vehicle module from said first of said vehicle module detectors to a second vehicle module detector in relation to the timer time period, said second vehicle module detector being a preselected distance from said first vehicle module detector and spaced in the direction of movement of vehicle modules, power means to change the speed of said vehicle module in response to differences between the time of vehicle module travel between said first and second vehicle module detectors and the associated timer means time period, and means to adjust the associated timer means time period as a function of elapsed time subsequent to the passage of said stop block behind a leading vehicle module previously actuating said first vehicle detector means and said timer means.

8. The control system of claim 7, said timer means including a basic timer having a normal time period, and said first means to adjust includes means to adjust the time period first to a longer time interval after passage of said stop block.

9. The control means of claim 10 and second means to adjust the time period to a shorter time interval for a preselected time after the first means to adjust the time period is no longer effective.

10. The control system of claim 1 and a second guideway means intersecting with said first guideway means, said second guideway means being divided into second guideway section, each of said second guideway sections including vehicle module detector means, and control means for regulating the spacing of vehicle modules in said second guideway sections, said control means and vehicle module detector means being interconnected between corresponding sections of said first and second guideways in relation to the merge point between said first guideway means and said second guideway means whereby vehicle module detector means in either guideway controls vehicle modules in corresponding guideway sections of both guideway means.

11. The combination as specified in claim 10 where said second guideway means comprises an acceleration guideway means, and wherein the sections of said acceleration guideway are different in length than the corresponding sections of the main guideway means except immediately adjacent the merge point, and said control means including timer means to determine elapsed time for movement of a vehicle module along the corresponding guideway sections and at least adjacent the merging guideway sections, the elapsed time for a vehicle module to traverse an interconnected section on either the intersecting guideway is substantially the same.

12. A control system for vehicle modules comprising one vehicle or a plurality of connected vehicles movable on a guideway means, comprising means effectively dividing said guideway into guideway control sections, power means on the guidway for propelling said vehicle modules normally supplying power to a vehicle in a guideway section, said means effectively dividing said guideway including vehicle module detector means mounted on said guideway for each section to detect a vehicle module position relative to its associated guideway section, and control means responsive to said vehicle detector means controlling said power means to regulate the spacing between a leading vehicle module and a trailing vehicle module, said power means comprising fluid under pressure to levitate and propel vehicle modules, valve means to control flow of fluid under pressure from a source to levitate said vehicle modules, and said control means includes means to prevent at least some of said valve means from operating in a preselected number of guideway sections behind said leading vehicle module.

13. The control system of claim 12, and means acting in response to said vehicle detectors to prevent a following vehicle module from advancing closer than a stop block comprising a preselected number of guideway sections to a leading vehicle module comprises means to stop a vehicle module when it moves closer than a preselected number of guideway sections to a leading vehicle module.

14. The control system according to claim 13, wherein said means to prevent a following vehicle from advancing closer than a preselected number of sections comprises OR gate means delivering disabling and braking signal means to said power means, said OR gate means having a plurality of inputs equal to the preselected number of guideway sections in said stop block, and means to operably connect the signal outputs of the vehicle module detector means of the guideway sections comprising the stop block to the inputs of said OR gate, said OR gate including means to deliver said disabling signal in response to a vehicle detector signal at any one of said OR gate inputs.

15. The system of claim 14 wherein said vehicle module comprises a single vehicle not substantially longer than the length of each guideway section.

16. The system of claim 14 wherein said vehicle module comprises a plurality of vehicles connected together and, means to prevent a vehicle module detector signal of one guideway section from entering its associated OR gate means until there is no vehicle module detector signal from the vehicle detector next adjacent and trailing said one guideway section.

17. The system of claim 13 and means to adjust the preselected timer period of said timer means to be longer in a selected number of timers associated with guideway sections immediately trailing said stop block.

18. The system of claim 13 and means to adjust the timer period of said timer to a shorter time period for the timers associated with selected guideway sections spaced a selected number of guideway sections from the last guideway section comprising a stop block for a leading vehicle.

19. The system of claim 13 and means to provide a power start signal to said power means in response to one vehicle module detector means signal, from a guideway section other than a section comprising said stop block, a preselected length of time after the one vehicle module detector means delivers a signal indicating presence of a vehicle module on its associated guideway section.

20. A control system for vehicle modules comprising one vehicle or a plurality of connected vehicles movable on a guideway means, comprising power means on the guideway for propelling said vehicle modules, means actuated to normally supply power to a vehicle module on the guideway, vehicle module detector means mounted on said guideway in spaced locations therealong to detect a vehicle module in position on the guideway, control means responsive to said vehicle detector means controlling said power means in portions of said guideway to regulate the spacing between a leading vehicle module and a trailing vehicle module in said portion of said guideway, including timer means initiated by detection of a vehicle module by one of said vehicle module detectors to determine the time of movement of a vehicle module from said one of said vehicle module detectors to a selected second vehicle module detector in relation to a selected set point time period of said timer means, means to control the power means to regulate the speed of said vehicle module in response to a difference between the elapsed time of vehicle module travel between said first and second vehicle module detectors and the set point time period, and means to adjust the set point time period of said timer means in response to passage of a vehicle module.

* * * * *

PO-1050
(5/69)

UNITED STATES PATENT OFFICE
CERTIFICATE OF CORRECTION
Page 1 of 2

Patent No. 3,771,463            Dated November 13, 1973

Inventor(s) Charles H. Smoot et al.

It is certified that error appears in the above-identified patent and that said Letters Patent are hereby corrected as shown below:

Col. 3, L. 67, 3,686,788 should be --3,685,788.

(Claim 1) Col. 21, L. 37 and 39 after "guideway" (first occurrence) insert --means--.

(Claim 2) Col. 21, L. 62 after "guideway" insert --control--.

(Claim 3) Col. 22, L. 6 after "guideway" insert --control--.

(Claim 4) Col. 22, L. 13 after "the" insert --reference--; L. 17 after "guideway" insert --means--; L. 18 "module" should be --modules--.

(Claim 5) Col. 22, L. 30 after "guideway" insert --means--; L. 39 "mans" should be --means--; L. 40 for "one" read --a first of--; L. 48 after "said" insert --first and second--; L. 51 after "vehicle" insert --module--; L. 53 after "guideway" insert --control--.

(Claim 6) Col. 22 lines 55-64, delete Claim 6 and substitute new Claim 6.

--6. The control system of Claim 5, and means acting between said guideway means and said vehicle modules to control propulsion of the vehicle modules as they traverse a particular guideway control section, and wherein said means to adjust the separate vehicle module speed in response to the time of travel thereof between said first and second vehicle module detector means includes means to prevent propulsive thrust from being supplied to the separate vehicle module after the separate vehicle module travels between said first and second vehicle module detector means in less than a preselected time.--

(Claim 7) Col. 22, line 65 through Co. 23, line 26, delete Claim 7 and substitute new Claim 7.

--7. A control system for vehicle modules comprising one vehicle or a plurality of connected vehicles moving along a guideway means, comprising means effectively dividing said guideway means into guideway control sections including vehicle module detector means mounted on said guideway means for each section to detect a vehicle module position in relation to its associated guideway control section, control means acting in response to said vehicle detector means to prevent a following separate vehicle module from advancing into a stop block comprising a preselected number of guideway control sections trailing a leading vehicle module, said control means including adjustable time period timer means started by a signal from a first vehicle module detector means detecting said separate vehicle module to measure the time of movement of said separate vehicle module from said first of said vehicle module detector means to a second vehicle module detector means in relation to the timer time period, said second vehicle module detector means being a preselected distance from said first vehicle module detector means and spaced in the direction of movement of vehicle modules, power means to change the speed of said separate vehicle module in response to differences between the time of separate vehicle module travel between said first and second vehicle module detector means and the associated timer means time period, and means to adjust the associated timer means time period as a function of elapsed time subsequent to the passage of said stop block behind a leading vehicle module previously actuating said first vehicle module detector means and said associated timer means.--

PO-1050
(5/69)

UNITED STATES PATENT OFFICE
CERTIFICATE OF CORRECTION
Page 2 of 2

Patent No. 3,771,463            Dated November 13, 1973

Inventor(s) Charles H. Smoot et al.

It is certified that error appears in the above-identified patent and that said Letters Patent are hereby corrected as shown below:

(Claim 10) Col. 23, L. 39 "section" should be--sections--; L. 46 "guideways" should be--guideway means--; L. 48 after "guideway" insert--means--.

(Claim 11) Col. 23, L. 54 after "guideway" insert--means--; L. 55 after "corresponding" insert --guideway control--; L. 61 after "interconnected" insert--guideway--; L. 62 delete "the"; after "guideway" insert--means--.

(Claim 12) Col. 23, L. 66 delete "means" (first occurrence); L. 68 delete "control".

(Claim 13) Col. 24, L. 19 cancel "detectors" and insert--module detector means--.

(Claim 14) Col. 24, L. 27 after "wherein" insert--the vehicle module detector means have signal outputs and--; L. 28 before "sections" insert--guideway--; L. 38 after "disabling insert--and braking--; after "signal" insert--means--; after "vehicle" insert--module--; L. 39 before "signal" insert--means--; after "signal" insert--output--.

(Claim 17) Col. 24, L. 51 delete "preselected timer" and insert--selected time--; L. 52 delete "timers" and insert--timer means--.

(Claim 18) Col. 24, L. 54 after "the" insert--selected--; "timer" (first occurrence) should be--time--; after "timer" (second occurrence) insert--means--; L. 56 "timers" should be--timer--; before "associated" insert--means--; L. 59 after "vehicle" insert--module--.

(Claim 19) Col. 24, L. 62 after "means" delete--signal--; L. 66 delete "delivers a signal"; L. 67 delete "cating" and insert--cates--.

(Claim 20) Col. 25, L. 3 delete "means" (first occurrence); L. 8 delete "first" and insert--one--.

Signed and sealed this 22nd day of October 1974.

(SEAL)
Attest:

McCOY M. GIBSON JR.
Attesting Officer

C. MARSHALL DANN
Commissioner of Patents